(12) United States Patent
Filkins

(10) Patent No.: US 8,912,681 B1
(45) Date of Patent: Dec. 16, 2014

(54) STAGED CLUSTER WINDER GENERATOR SYSTEM

(71) Applicant: Steven J. Filkins, Claremore, OK (US)

(72) Inventor: Steven J. Filkins, Claremore, OK (US)

(*) Notice: Subject to any disclaimer, the term of this patent is extended or adjusted under 35 U.S.C. 154(b) by 0 days.

(21) Appl. No.: 13/974,516

(22) Filed: Aug. 23, 2013

(51) Int. Cl.
*F03D 9/00* (2006.01)

(52) U.S. Cl.
USPC .............................................. 290/55; 290/44

(58) Field of Classification Search
USPC .......................................... 290/43, 44, 54, 55
See application file for complete search history.

(56) References Cited

U.S. PATENT DOCUMENTS

| | | | |
|---|---|---|---|
| D252,572 S | 8/1979 | Hanson | |
| 4,585,950 A * | 4/1986 | Lund | 290/44 |
| 6,304,002 B1 * | 10/2001 | Dehlsen et al. | 290/1 C |
| 6,731,017 B2 * | 5/2004 | Mikhall et al. | 290/1 C |
| 6,933,625 B2 | 8/2005 | Feddersen et al. | |
| 6,965,174 B2 | 11/2005 | Wobben | |
| 6,969,922 B2 | 11/2005 | Welches et al. | |
| 6,998,723 B2 * | 2/2006 | Kong et al. | 290/1 C |
| 7,042,110 B2 | 5/2006 | Mikhail et al. | |
| 7,069,802 B2 * | 7/2006 | Mikhail et al. | 74/410 |
| 7,259,471 B2 * | 8/2007 | Basteck | 290/43 |
| 7,635,923 B2 * | 12/2009 | DeAngeles | 290/44 |
| 7,936,078 B2 | 5/2011 | Pavlak | |
| 8,178,991 B2 | 5/2012 | Smith | |
| 8,710,694 B2 * | 4/2014 | Smith | 290/55 |
| 2006/0138780 A1 * | 6/2006 | Flamang et al. | 290/55 |
| 2011/0121575 A1 * | 5/2011 | Anetrini et al. | 290/55 |

* cited by examiner

*Primary Examiner* — Nicholas Ponomarenko

(57) ABSTRACT

A staged cluster wind generator system generates electrical power from wind. The system includes a base and a housing coupled to a top end of the base. A primary generator is coupled to and positioned in the housing. A drive shaft is mechanically coupled to and extends from the primary generator through the housing. A propeller is coupled to the drive shaft and configured for being rotated by wind wherein the drive shaft drives the primary generator. An annular main gear is coupled to the drive shaft and rotated by rotation of the drive shaft. Each of a plurality of secondary generators is coupled to the housing. Each secondary generator has a drive gear operationally coupled to the annular main gear wherein rotation of the drive shaft drives each secondary generator.

8 Claims, 5 Drawing Sheets

STAGED CLUSTER WINDER GENERATOR SYSTEM

BACKGROUND OF THE DISCLOSURE

Field of the Disclosure

The disclosure relates to wind driven generator devices and more particularly pertains to a new wind driven generator device for generating electrical power from wind,

SUMMARY OF THE DISCLOSURE

An embodiment of the disclosure meets the needs presented above by generally comprising a base and a housing coupled to a top end of the base. A primary generator is coupled to and positioned in the housing. A drive shaft is mechanically coupled to and extends from the primary generator through the housing. A propeller is coupled to the drive shaft and configured for being rotated by wind wherein the drive shaft drives the primary generator. An annular main gear is coupled to the drive shaft and rotated by rotation of the drive shaft. Each of a plurality of secondary generators is coupled to the housing. Each secondary generator has a drive gear operationally coupled to the annular main gear wherein rotation of the drive shaft drives each secondary generator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
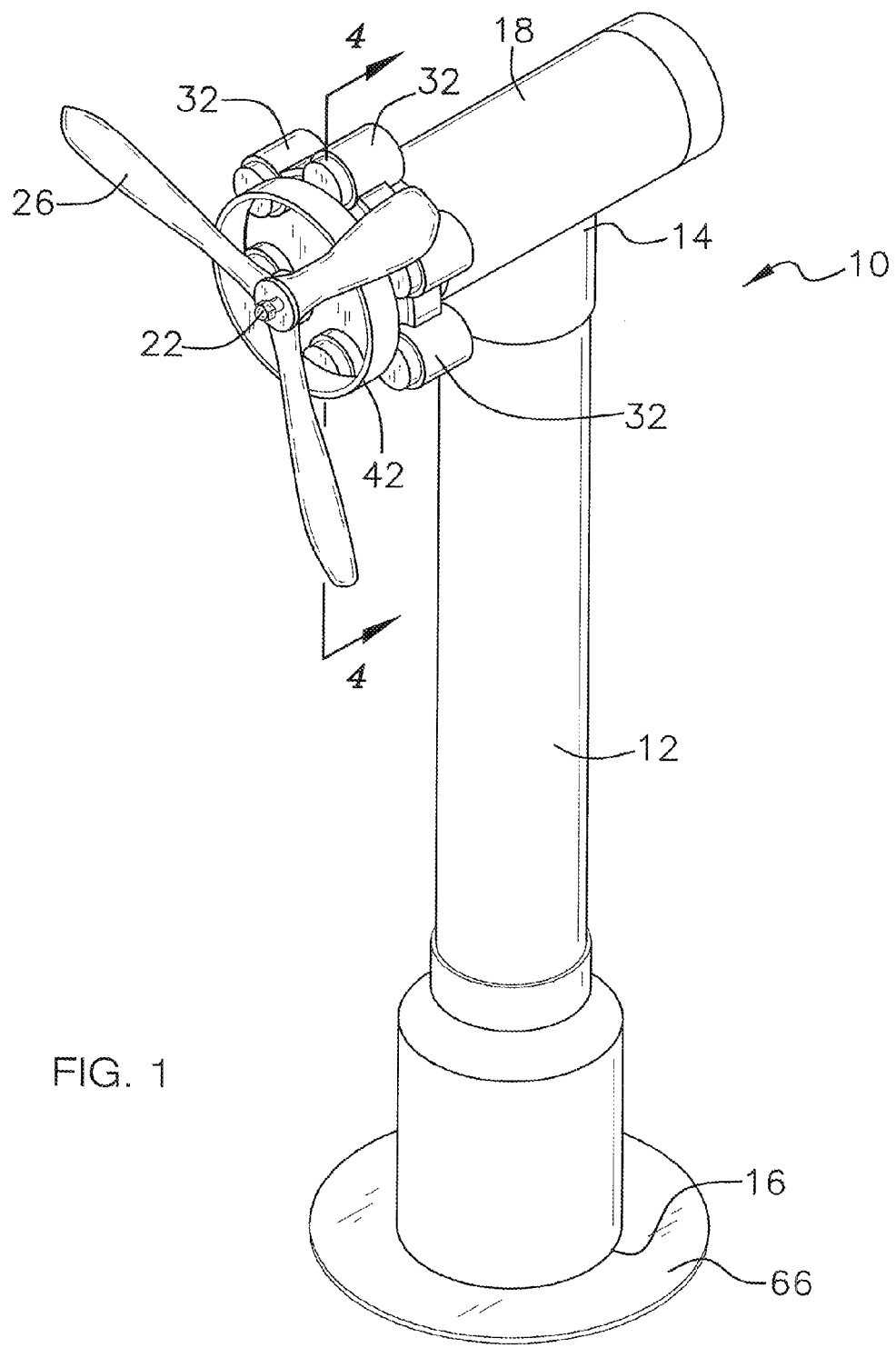
FIG. 1 is a top front side perspective view of a staged cluster wind generator system, according to an embodiment of the disclosure.
Figure 2:
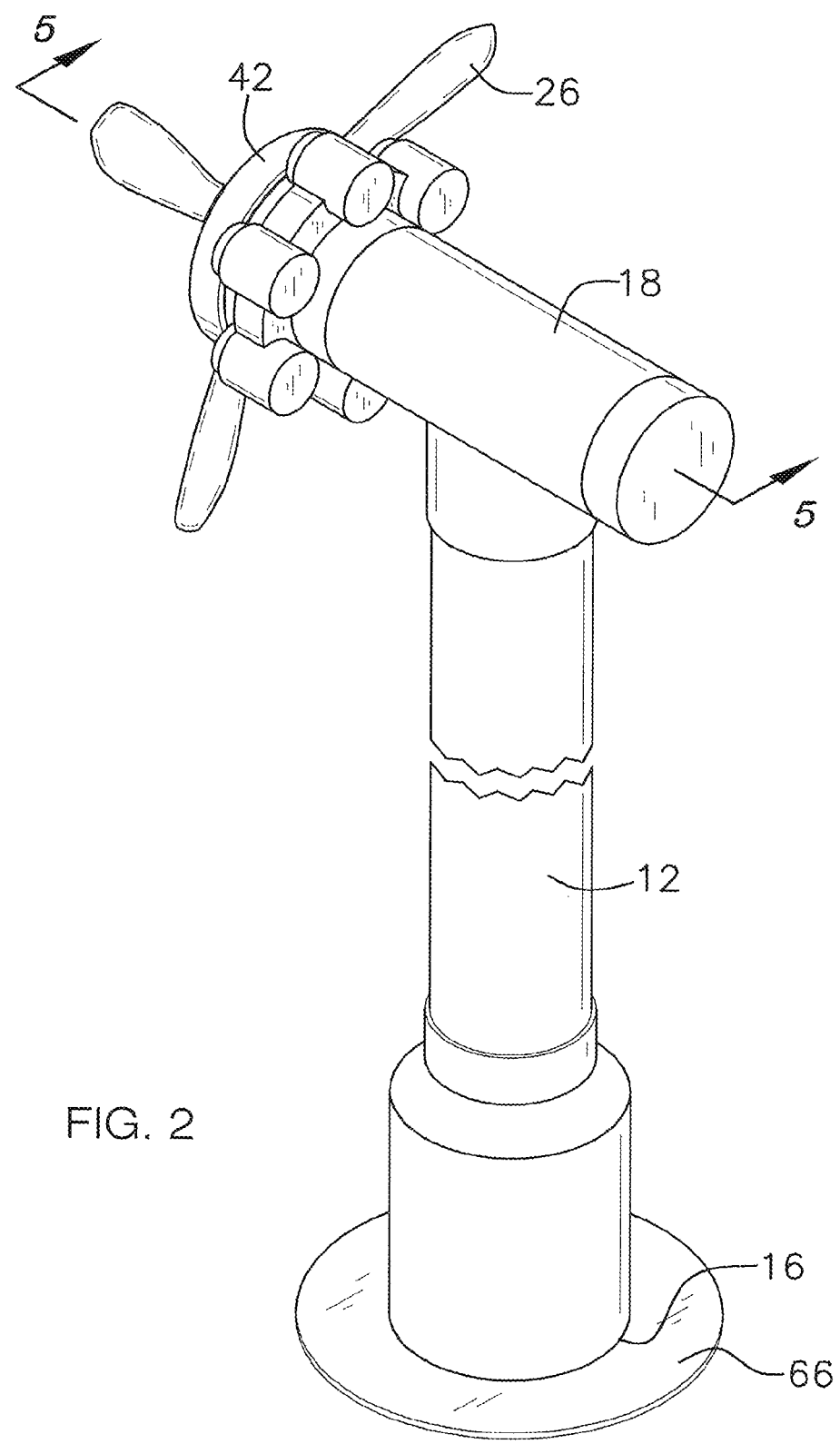
FIG. 2 is a top back side perspective view of an embodiment of the disclosure.
Figure 3:
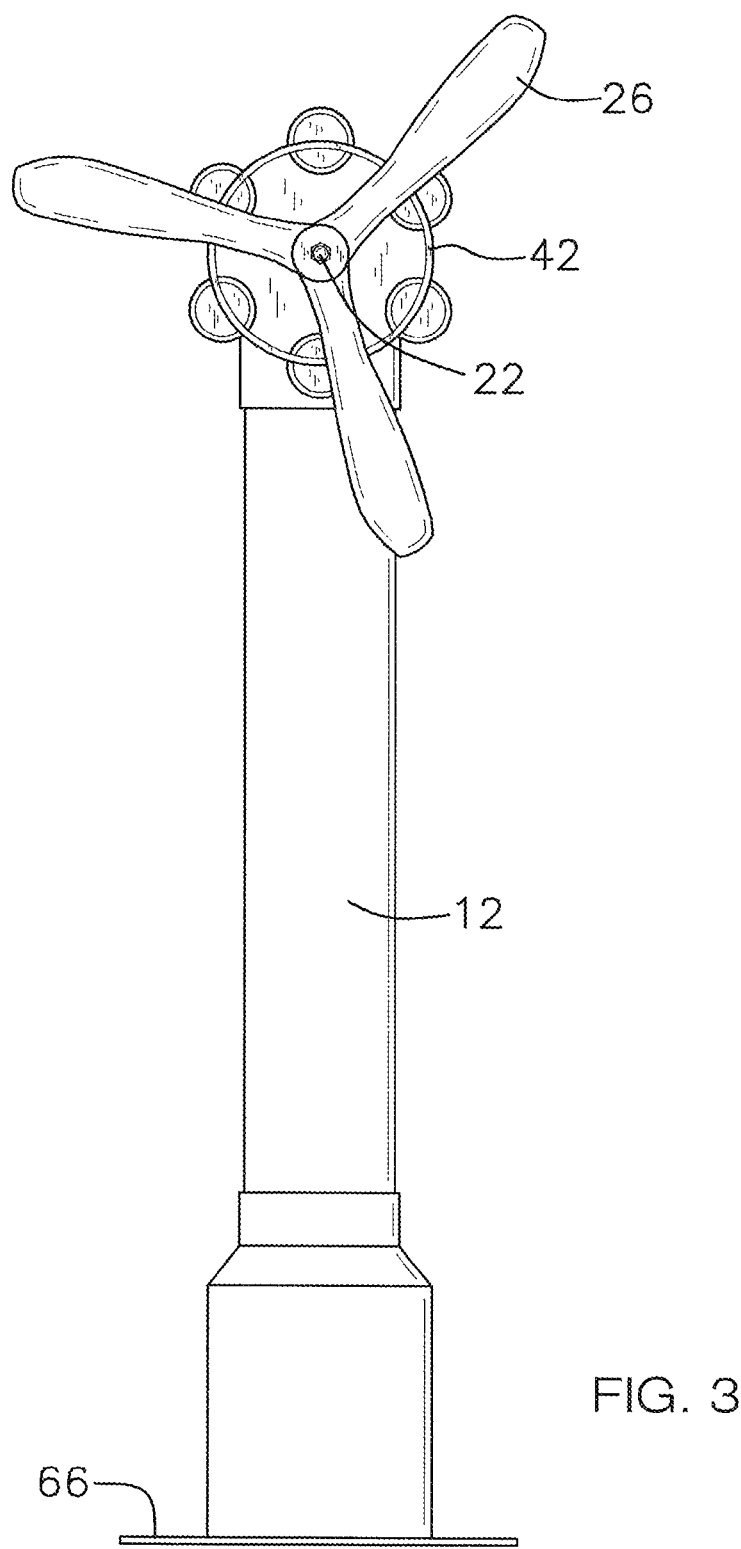
FIG. 3 is a front view of an embodiment of the disclosure.
Figure 4:
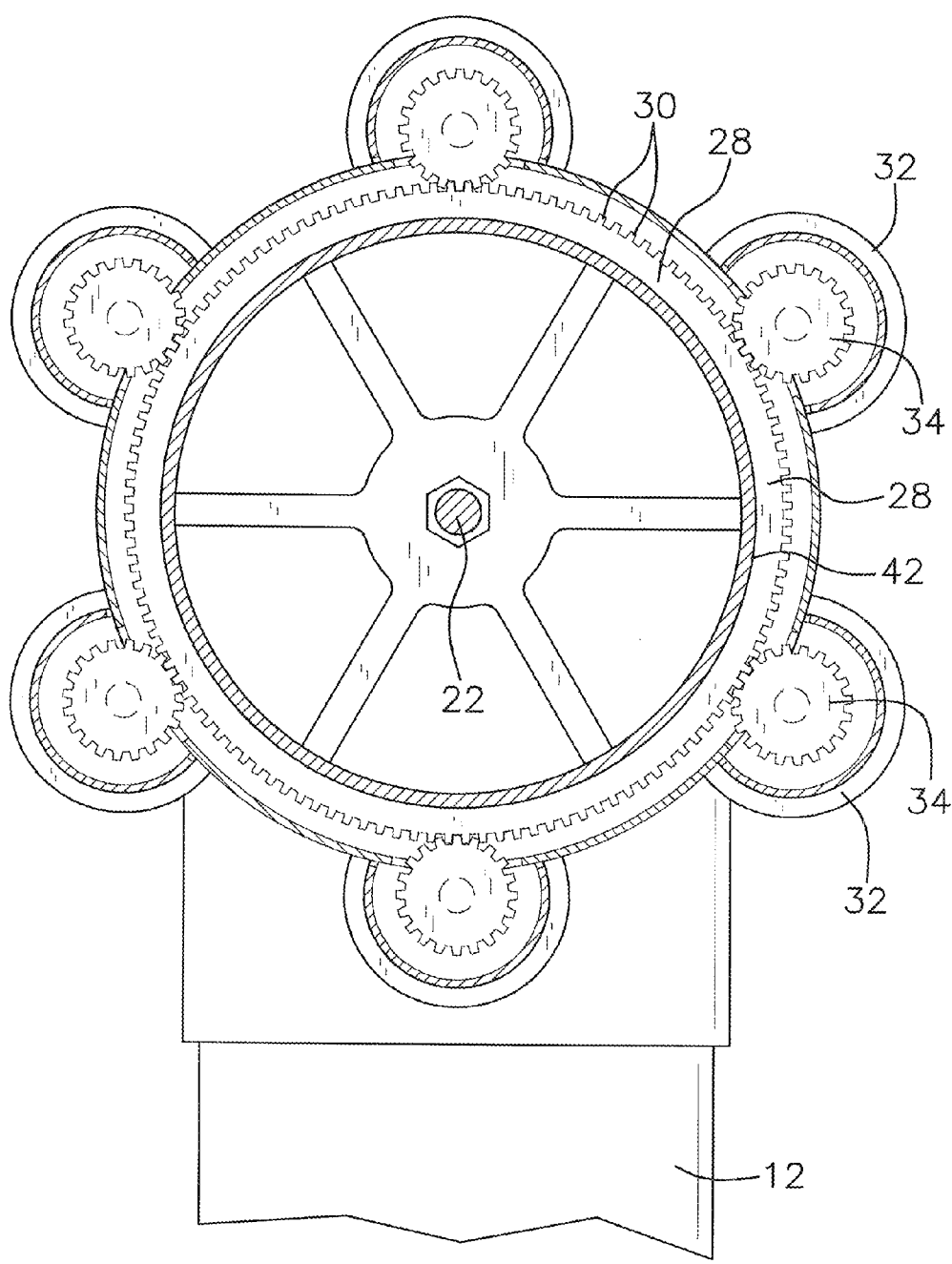
FIG. 4 is a cross-sectional view of an embodiment of the disclosure taken along line 4-4 of FIG. 1.
Figure 5:
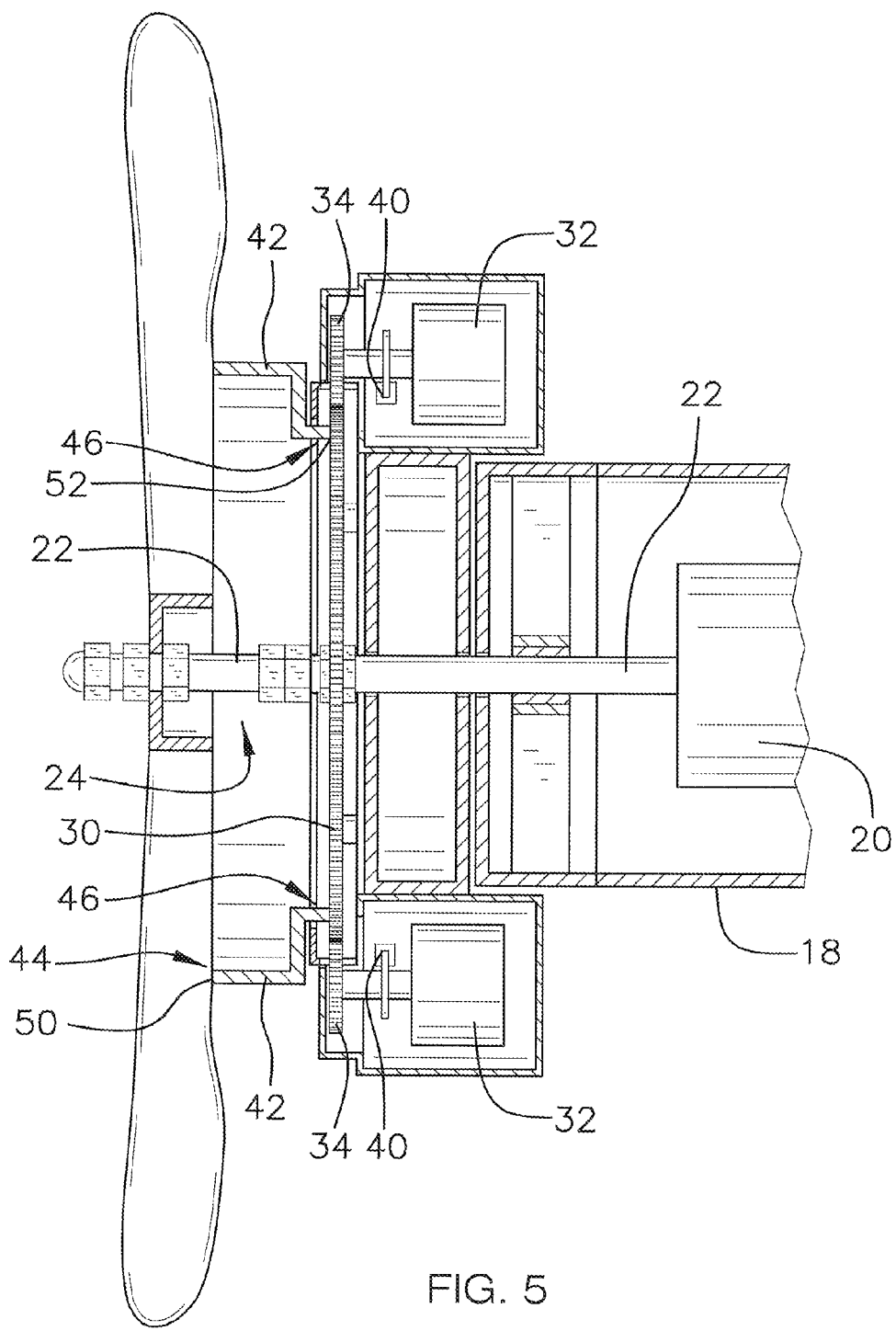
FIG. 5 is a cross-sectional view of an embodiment of the disclosure taken along line 5-5 of FIG. 2.

With reference now to the drawings, and in particular to FIGS. 1 through 5 thereof, a new wind driven generator device embodying the principles and concepts of an embodiment of the disclosure and generally designated by the reference numeral 10 will be described.

As best illustrated in FIGS. 1 through 5, the staged cluster wind generator system 10 generally comprises an elongated base 12 having a top end 14 and a bottom end 16. The bottom end 16 is configured for coupling to a supporting surface 66 such as a structure, a footing, or the like. A substantially cylindrical housing 18 is coupled to the top end 14 of the base 12. A primary generator 20 is coupled to and positioned in the housing 12. A drive shaft 22 is mechanically coupled to and extends from the primary generator 20. The drive shaft 22 extends through the housing 12 such that a distal section 24 of the drive shaft 22 relative to the primary generator 20 is positioned outside the housing 12. A propeller 26 is coupled to the distal section 24 of the drive shaft 22 to rotate the drive shaft 22 by wind power. The propeller 26 is configured for being rotated by wind wherein the drive shaft 22 drives the primary generator 20.

An annular main gear 28 is coupled to the drive shaft 22 between the primary generator 20 and the propeller 26. The annular main gear 28 is rotated by rotation of the drive shaft 22. The annular main gear 28 may have outwardly facing teeth 30 extending around the annular main gear 28. Each of a plurality of secondary generators 32 is coupled to the housing 12. Each secondary generator 32 has a drive gear 34 operationally coupled to the annular main gear 28 wherein rotation of the drive shaft 22 drives each secondary generator 32. The secondary generators 32 may be positioned in a radial array around the housing 12. The drive gear 34 of each secondary generator 32 engages the outwardly facing teeth 30. Each drive gear 34 may be engaged by a clutch assembly 40. Thus, each clutch assembly 40 is operationally coupled to an associated one of the secondary generators 32 and may be selectively engaged and disengaged to activate or deactivate each secondary generator 32.

A support member 42 may be provided having a first side 44 coupled to the propeller 26 in radially spaced relationship to the drive shaft 22. The support member 42 has a second side 46 coupled to the annular main gear 28 wherein the propeller 26 is supported by the main gear 28 as well as the drive shaft 22. An outer edge 50 of the first side 44 of the support member 42 may be outwardly offset from an outer edge 52 of the second side 46 of the support member 42 providing additional stability to the propeller 26 and allowing for increased propeller size as opposed to conventional attachment to the drive shaft 22 alone.

In use, the system 10 may be employed to generate electricity from wind. The system 10 may be used with a single unit or as an array of many units in combination.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A staged cluster wind generator system comprising:
a base having a top end and a bottom end, said bottom end being configured for coupling to a supporting surface;
a housing coupled to said top end of said base;
a primary generator coupled to said housing, said primary generator being positioned in said housing;
a drive shaft mechanically coupled to and extending from said primary generator, said drive shaft extending through said housing;
a propeller coupled to said drive shaft, said propeller being configured for being rotated by wind wherein said drive shaft drives said primary generator;
an annular main gear coupled to said drive shaft, said annular main gear being rotated by rotation of said drive shaft;
a plurality of secondary generators, each secondary generator being coupled to said housing, each secondary generator having a drive gear operationally coupled to said annular main gear wherein rotation of said drive shaft drives each said secondary generator.

2. The system of claim 1, further comprising a plurality of clutch assemblies, each clutch assembly being operationally coupled to an associated one of said secondary generators.

3. The system of claim 1, further comprising said housing being cylindrical.

4. The system of claim 3, further comprising said secondary generators being positioned in a radial array around said housing.

5. The system of claim 4, further comprising:
said annular main gear having outwardly facing teeth extending around said annular main gear; and
said drive gear of each said secondary generator engaging said outwardly facing teeth.

6. The system of claim 1, further comprising a support member having a first side coupled to said propeller in radially spaced relationship to said drive shaft, said support member having a second side coupled to said annular main gear wherein said propeller is supported by said main gear and said drive shaft.

7. The system of claim 6, further comprising an outer edge of said first side of said support member being outwardly offset from an outer edge of said second side of said support member.

8. A staged cluster wind generator system comprising:
a base having a top end and a bottom end, said bottom end being configured for coupling to a supporting surface;
a substantially cylindrical housing coupled to said top end of said base;
a primary generator coupled to said housing, said primary generator being positioned in said housing;
a drive shaft mechanically coupled to and extending from said primary generator, said drive shaft extending through said housing;
a propeller coupled to said drive shaft, said propeller being configured for being rotated by wind wherein said drive shaft drives said primary generator;
an annular main gear coupled to said drive shaft, said annular main gear being rotated by rotation of said drive shaft, said annular main gear having outwardly facing teeth extending around said annular main gear;
a plurality of secondary generators, each secondary generator being coupled to said housing, each secondary generator having a drive gear operationally coupled to said annular main gear wherein rotation of said drive shaft drives each said secondary generator, said secondary generators being positioned in a radial array around said housing, said drive gear of each said secondary generator engaging said outwardly facing teeth;
a plurality of clutch assemblies, each clutch assembly being operationally coupled to an associated one of said secondary generators;
a support member having a first side coupled to said propeller in radially spaced relationship to said drive shaft, said support member having a second side coupled to said annular main gear wherein said propeller is supported by said main gear and said drive shaft; and
an outer edge of said first side of said support member being outwardly offset from an outer edge of said second side of said support member.

* * * * *